United States Patent [19]
Rutherford et al.

[11] Patent Number: 5,954,412
[45] Date of Patent: Sep. 21, 1999

[54] HIGH LOAD AQUARIUM SUPPORT CABINET

[76] Inventors: Richard Rutherford, 1893 County Rd. 220; Harold Mitchell, 2701 Lexington Dr., both of Orange Park, Fla. 32073

[21] Appl. No.: 09/041,334

[22] Filed: Mar. 12, 1998

[51] Int. Cl.⁶ .................................................. A47B 43/00
[52] U.S. Cl. ...................... 312/258; 312/140.2; 108/162; 108/157.15
[58] Field of Search ................................. 312/258, 259, 312/262, 140.2, 140.3, 140.1; 108/115, 193, 157.17, 162, 159, 157.15, 157.14; 211/149, 135; 220/4.29, 6; 217/16, 48; 248/150, 188.1

[56] References Cited

U.S. PATENT DOCUMENTS

| | | | |
|---|---|---|---|
| D. 306,664 | 3/1990 | Pouch ............................... | 312/140.2 X |
| 1,261,162 | 4/1918 | Phillips .................................... | 312/258 |
| 3,866,550 | 2/1975 | Geschwender ..................... | 108/157.14 |
| 3,955,864 | 5/1976 | MacDonald et al. .................... | 312/258 |
| 4,747,644 | 5/1988 | Gallery et al. ....................... | 312/262 X |
| 5,315,935 | 5/1994 | Weisenfels ........................... | 108/115 X |
| 5,382,087 | 1/1995 | Pouch .................................. | 312/258 X |
| 5,405,192 | 4/1995 | McGrath ............................. | 312/258 X |

*Primary Examiner*—Peter M. Cuomo
*Assistant Examiner*—Janet M. Wilkens
*Attorney, Agent, or Firm*—Kennedy Covington Lobdell & Hickman, L.L.P.

[57] ABSTRACT

A high load support stand or cabinet for aquariums or other heavy objects, the stand having a pair of side members pivotally joined by hinges to a front member, a back brace member fitting into slots in the side member, a bottom member and a top member each having a flange extending around front and side edges and a plural number of detent members to define a receiving channel to receive the top and bottom edges respectively of the top member and the bottom member, such that the stand can be stored in an unassembled flat version and assembled without the need for additional mechanical fasteners or adhesives.

8 Claims, 4 Drawing Sheets

HIGH LOAD AQUARIUM SUPPORT CABINET

BACKGROUND OF THE INVENTION

This invention elates generally to high load bearing cabinet stands used to support aquariums or the like, and more particularly to such cabinets which are composed of multiple components having a flat profile before assembly and which are assembled to form the cabinet stand without the need for additional mechanical fasteners.

Aquariums present problems in providing adequate support in that a loaded aquarium will range from about 120 pounds for a small 10 gallon size up to about 1800 pounds for large tanks found in commercial settings. Since it is almost always preferred that the aquariums be presented above floor level, support stands or cabinets must be provided. Because of the large weights involved, these stands must be solidly constructed to withstand the high loads, shears and stresses. Because of this requirement, known cabinets or stands are constructed of relatively thick wood members securely joined by mechanical fasteners and/or adhesives. These units are either prefabricated, which presents transport and storage problems for the retailer, or require extensive assembly by the purchaser, which presents the possibility of misassembly. There is a need for a suitably strong cabinet stand for aquariums which can be sold in a carton with all member components flat to minimize the size of the carton, but which can be assembled to form the completed cabinet without the application of additional mechanical fasteners or adhesives by merely positioning the members in proper manner.

To meet this need, it is an object of this invention to provide a cabinet stand for an aquarium which is capable of meeting all load, shear and stress requirements dictated by the weight of the tank, which is sold and delivered to the end user with all components flat, such that the unit may be stored in a carton of relatively small overall dimension, yet which can be assembled by hand with no need for the connection of additional fastening hardware. It is a further object to provide such a device which can be assembled without the need to join or connect any fastener elements at all, in that the component members are engaged simply be proper positioning.

SUMMARY OF THE INVENTION

The invention is a cabinet stand for an aquarium, the cabinet composed of assembled, flat component members which in combination form a three dimensional stand capable of securely supporting the weight of the aquarium, where the component members comprise a front member, two side members, a top member, a bottom member and a back brace member. The side members are joined to the front member by hinges whereby the two side members can be pivoted against the rear of the front member to lie flat during storage, and then pivoted perpendicular to the front member for assembly. The top member and bottom member are preferably identical, each comprising a flat upper and lower surface with an overhanging flange around the front and side edges, with interior channel defining members which create receiving channels along the front and side edges, in effect defining a segmented C-shaped channel. The C-shaped channel of the top member receives the upper edges of the front and side members, while the C-shaped channel of the bottom member receives the lower edges of the front and side members. Each of the side members is provided with a vertically oriented slot adjacent the back edge, the slot extending only partially toward the bottom of the side member. The back brace member is inserted into these slots with the top edge of the back brace member flush with the top edges of the side members and front member, so that the top member is supported across its rear underside edge as well as its front and side edges. The hinge members are necessary to secure the cabinet stand against shearing. To assemble the cabinet, the bottom is placed on the floor with the C-shaped channel up, the side members are pivoted to the right angle position relative to the front member and the bottom edge of these components are placed into the channel. The back brace member is inserted in the slots and the top member is placed onto the front, side and back members with the C-channel facing down to receive the upper edges of each member. The back brace member only partially covers the back side so that tubes, hoses, power cords, etc. can pass therethrough, and the front member is provided with doors to allow access into the interior of the cabinet stand.

DETAILED DESCRIPTION OF THE INVENTION

With reference to the drawings, the invention will now be described in detail with regard for the best mode and the preferred embodiment. The invention is a cabinet stand for an aquarium or other high load situation which is comprised of a plural number of individual component members, each of which individually has a generally flat configuration such that shipping and storage is easily accomplished within a relatively small carton, the disassembled components being stackable in the packaged state. The particular configurations and shapes of the individual component members define the means to enable an assembled cabinet stand which is capable of sustaining high load, shear and stress forces, where the components are interconnected in a manner which does not require application of additional mechanical fasteners or adhesives to join the components.

Figure 1:
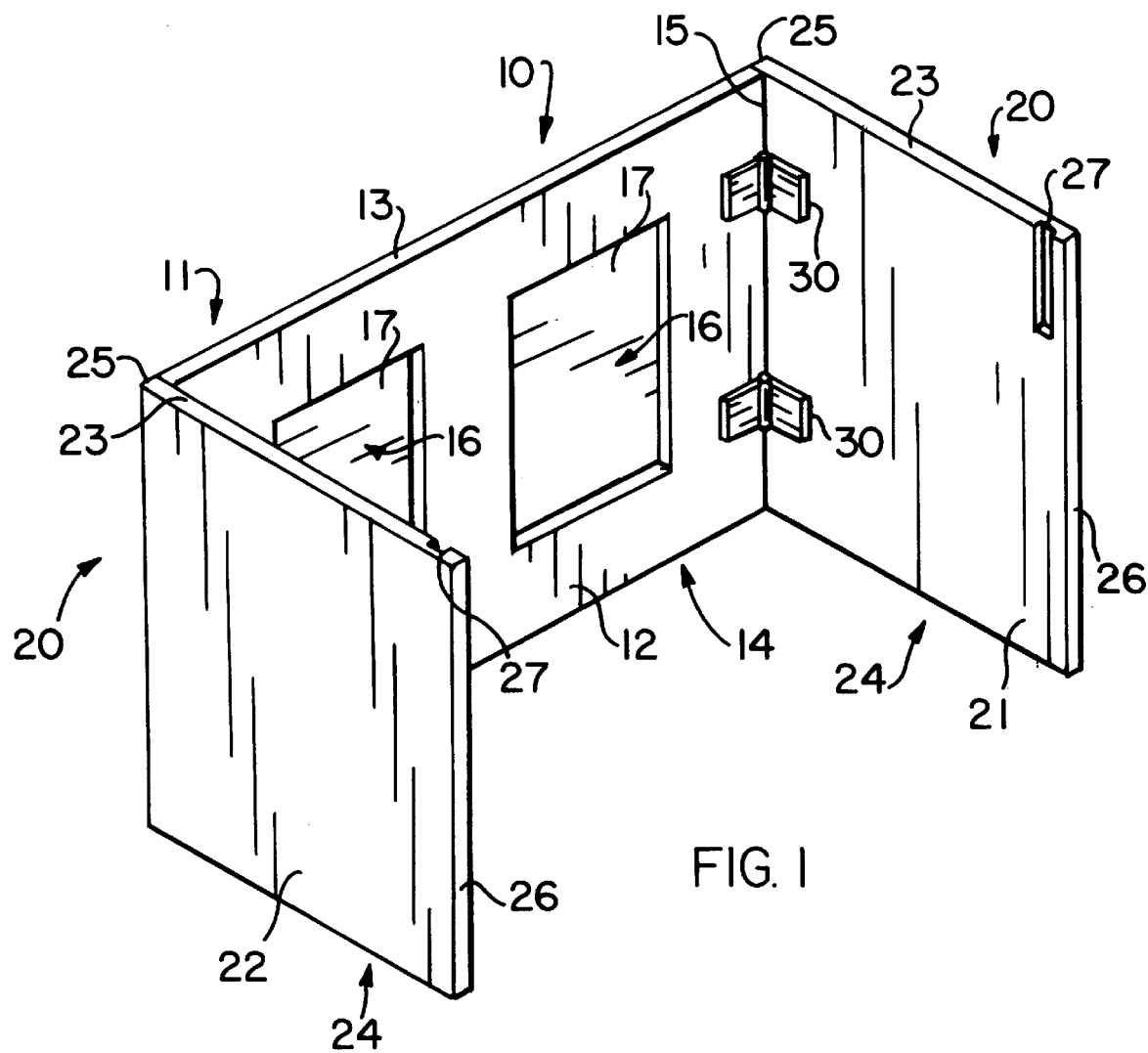
FIG. 1 is a rear perspective view of the front and side members of the invention, with the side members shown in the fully opened configuration.
Figure 6:
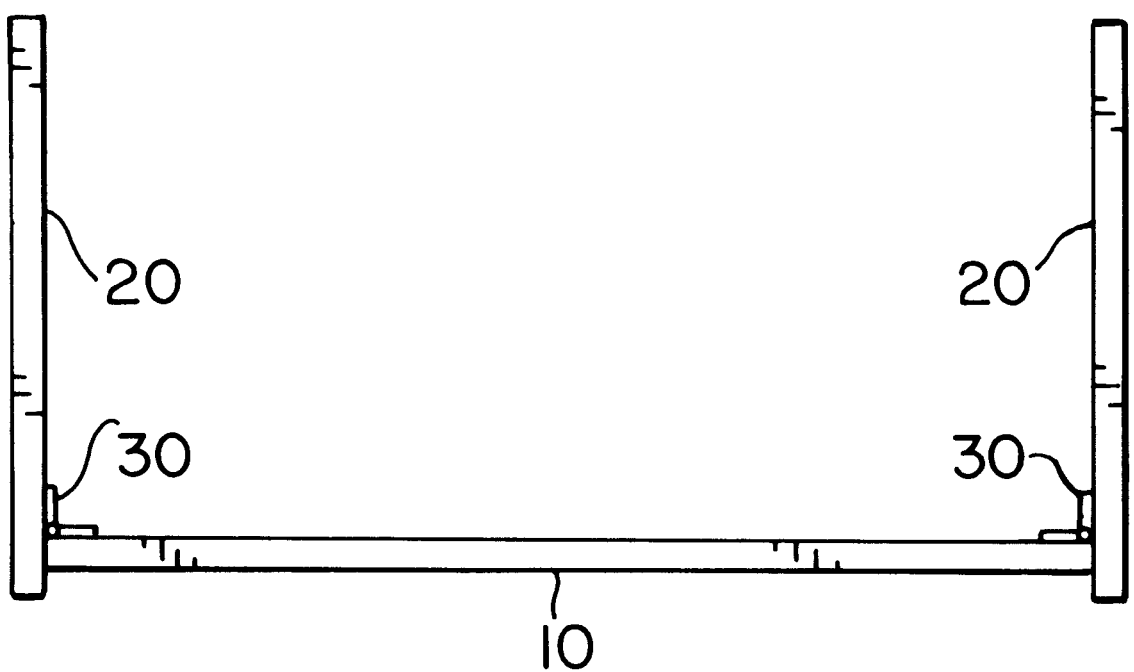
FIG. 6 is a top view of the front and side members, showing the front edges of the side members extending beyond the front member.

Referring now to FIG. 1, which is a rear perspective, the front member 10 and two side members 20 are shown. Front member 10 comprises a generally rectangular panel or sheet, preferably composed of a solid wood or laminate material, as are all the wall structural components, having a front side 11, rear side 12, top edge 13, bottom edge 14 and two side edges 15. Preferably front member 10 is also provided with one or more openings 16 to allow access into the interior of the cabinet stand, with the openings 16 covered by hinged doors 17. Hingedly joined to the front member 10 are a pair of side members 20, also being generally rectangular in overall configuration. Each side member 20 comprises an interior side 21, exterior side 22, top edge 23, bottom edge 24, front edge 25 and back edge 26. Each of the side members 20 is connected to the front member 20 such that the front edge 25 of the side member 20 is flush with or as when in FIG. 6 extends slightly beyond the front side 11 of the front member 10, and such that the side edge 15 of the front member 10 abuts the interior side 21 of the side member 20 when the side member 20 is positioned at a right angle to the front member 10.

Figure 2:
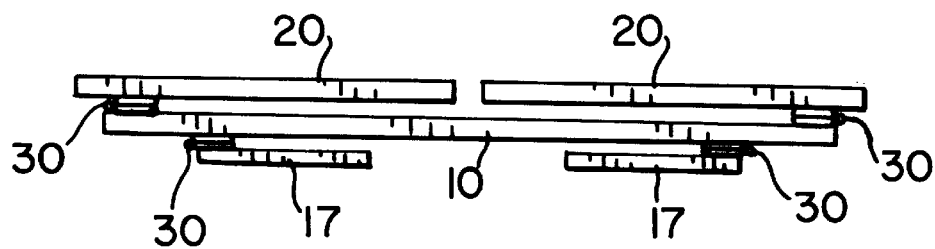
FIG. 2 is a bottom edge view of the front and side members in the folded configuration.

The side members 20 are joined to the front member 10 by hinge members 30, of any suitable type known in the art, mounted onto the rear side 12 of front member 10 adjacent the side edge 15, and onto the interior side 21 of each side member 20 a short distance from the front edge 25 so that the configuration described above is achieved when the side members 20 are pivoted to the right angle position relative to the front member 10. This placement of the hinge members 30 also enables the front member 10 and side members 20 to be folded as shown in FIG. 2 to present a flat, compact configuration for packaging and storage. The hinge members 30 are required to join the front member 10 and side members 20 to provide structural resistance against shearing when subjected to a heavy load. The relative positioning of the side members 20 to the front member 10 and the location of the hinge members 30 prevents the side members 20 from pivoting beyond 90 degrees. The height of the side members 20 and front member 10 are equal, such that the bottom edges 14 and 24 are even and the top edges 13 and 23 are even.

Each of the side members 20 further comprises a vertically oriented slot 27, preferably only partially recessed into the body of each side member so that it does not pass completely through, positioned near the back edge 26 and extending down from the top edge 23. The slots 27 receive the back brace member 60 and are sized such that back brace member 60 can be inserted therein with its top edge 61 even with the top edges 23 of the side members 20. Back brace member 60 is a rectangular member having a top edge 61, side edges 63 which fit into the slots 27 and a bottom edge 63 which does not contact the bottom member 40, thus leaving a large open access area 70 in the rear of the cabinet stand for the passage of tubes, hoses, wires or other equipment.

Figure 3:
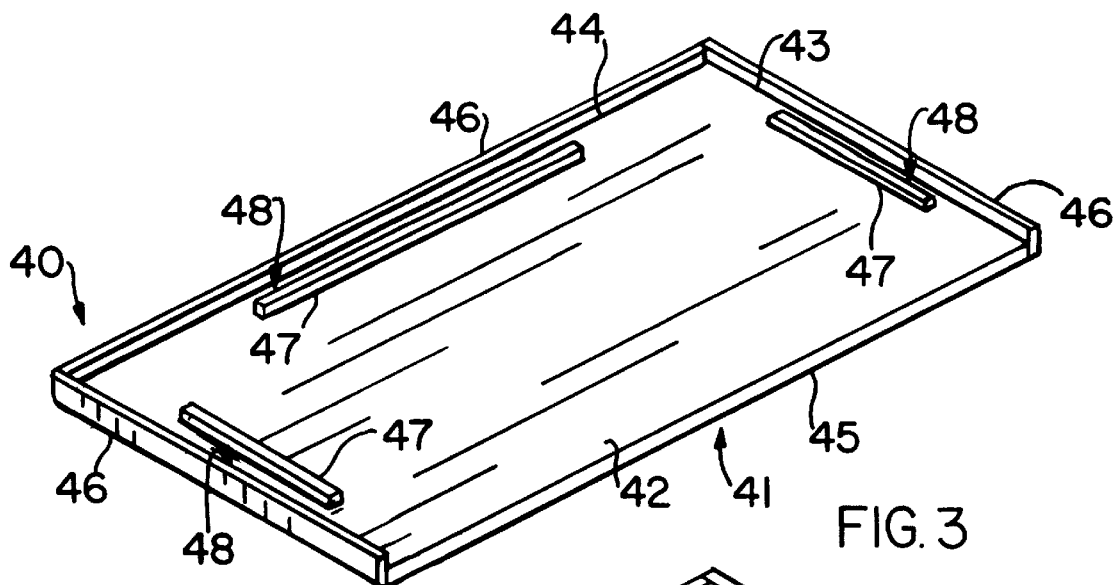
FIG. 3 is a rear, upper perspective view of the bottom member.
Figure 5:
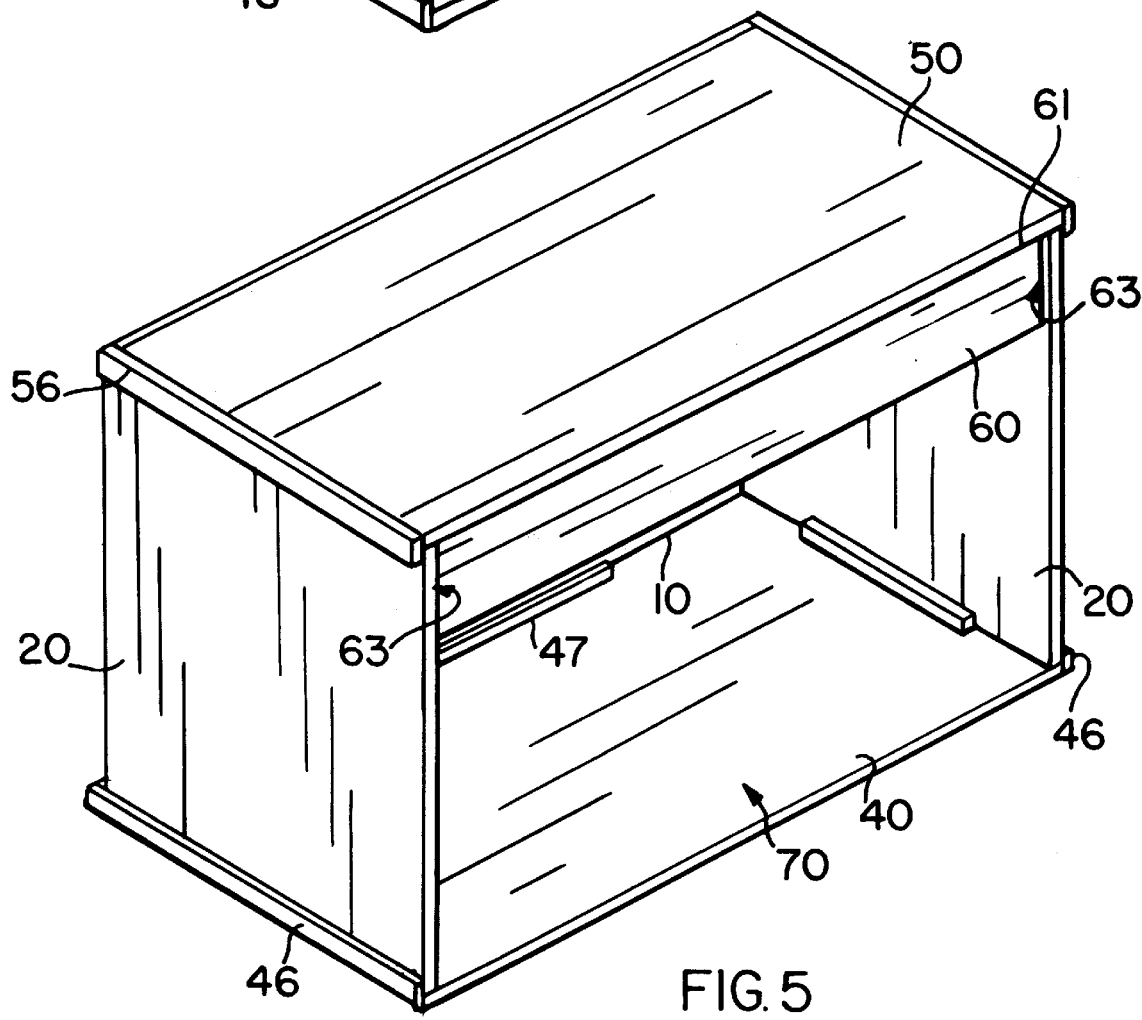
FIG. 5 is a rear perspective view of the assembled cabinet.

Bottom member 40 is shown in FIG. 3, and comprises an exterior side 41, interior side 42, side edges 43, front edge 44, and back edge 45. Joined to the front edge 44 and side edges 43, preferably extending their entire lengths, is flange member 46. Flange 46 extends above the interior side 42 of the bottom member 40 to form a lip or shoulder. Positioned on the interior side 42 of the bottom member 40 are detent members 47, preferably having a planar edge or side facing the flange member 46. At least one detent member 47 is positioned adjacent but separated a short distance from the front edge 44 and each side edge 43. The separation distance between the flange 46 and the detent members 47 is approximately equal to or only slightly larger than the thickness of the front member 10 and the side members 20. The combination of each of the individual detent members 47 and the opposing portion of the flange member 46 defines a receiving channel 48, such that the bottom edge 14 of the front member 10 and the bottom edges 24 of the side members may be received therein when the front member 10 and side members 20 are placed onto the interior side 42 of the bottom member 40, as seen in FIG. 5. In combination, the flange 46 and the detent members 47 define a segmented, generally C-shaped receiving channel 48.

Figure 4:
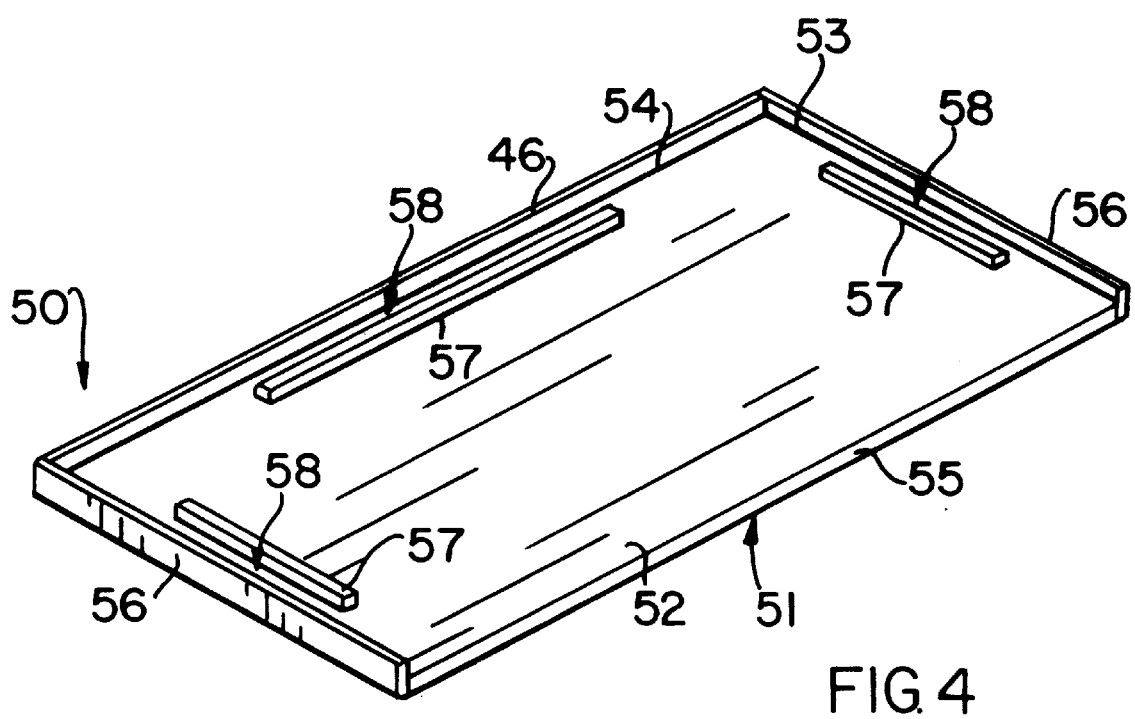
FIG. 4 is rear, lower perspective view of the top member.

Top member 50, as shown in FIG. 4, is preferably constructed identically to the bottom member 40, and comprises an exterior side 51, interior side 52, side edges 53, front edge 54, back edge 55, flange 56 and detent members 57, which define a segmented, generally C-shaped receiving channel 58. In this case, the receiving channel 58 receives the top edge 13 of the front member 10 and the top edges 23 of the side members 20 when the top member 50 is placed onto the front member 10 and side members 20, as seen in FIG. 5.

To construct the cabinet stand, the bottom member 40 is placed on the floor such that the interior side 42 faces up. The side members 20 are pivoted from the folded position to the maximum open position perpendicular to the front member 10, and this unit is then placed onto the bottom member 40 such that the bottom edges 14 and 24 are situated within channel 48 between the flange 46 and detent members 47. The back brace member 60 is then inserted into the slots 27 of the side members 20. Top member 50 is then placed onto the front member 10 and side members 20 such that the top edges 13 and 23 are positioned within the channel 58 formed by the flange 56 and detent members 57. In this manner a sturdy, rigid cabinet stand results with all load, shear and stresses forces accounted for.

It is understood that equivalents and substitutions for certain elements set forth above may be obvious to those skilled in the art, and the true scope and definition of the invention therefore is to be as set forth in the following claims.

We claim:

1. A high load support stand comprising:
   (A) a generally rectangular front member comprising a top edge, a bottom edge, two side edges, a rear side and a front side;
   (B) a pair of generally rectangular side members, each side member comprising a top edge, a bottom edge, a front edge, a back edge and an interior side, said side members being the same height as said front member and being pivotally joined perpendicularly to said front member such that each of said side edges of said front member abuts said interior side of one of said side members, and each of said side members having a slot adjacent said back edge and extending from said top edge toward said bottom edge;
   (C) hinge members connected to said rear side of said front member and said interior sides of said side members and joining said front member to said side members such that said side members are pivotable to a position parallel with said front member when said support stand is not assembled;
   (D) a generally rectangular bottom member comprising a front edge, a back edge, two side edges, an interior side, detent members and a flange member, said flange member connected to said front edge and said side edges and extending above said interior side of said bottom member, and said detent members positioned on said interior side of said bottom member with at least one detent member located a distance from said front edge of said bottom member approximately equal to the width of said front member and with at least one detent member located a distance from one of said side edges of said bottom member approximately at least equal to the width of one of said side members and with at least one detent member located a distance from the other of said side edges of said bottom member approximately at least equal to the width of the other of said side members whereby the combination of said flange member and said detent members define receiving channels which receive the bottom edges of said front member and said side members therein;

(E) a generally rectangular top member comprising a front edge, a back edge, two side edges, an interior side, detent members and a flange member, said flange member connected to said front edge and said side edges and extending below said interior side of said top member, and said detent members positioned on said interior side of said top member with at least one detent member located a distance from said front edge of said top member approximately equal to the width of said front member and with at least one detent member located a distance from one of said side edges of said top member approximately at least equal to the width of one of said side members and with at least one detent member located a distance from the other of said side edges of said bottom member approximately at least equal to the width of the other of said side members whereby the combination of said flange member and said detent members define receiving channels which receive the top edges of said front member and said side members therein; and (F) a generally rectangular back brace member having a top edge and two side edges, where said side edges of said back brace member fit within said slots of said side members such that said top edge of said back brace member is even with said top edges of said side members;

whereby said support stand is assembled such that said bottom edges of said front member and said side members are inserted into said receiving channels of said bottom member, said back brace member is inserted into said slots of said side members, and said top member is placed onto said front member and side members such that said top edges of said front member and said side members are inserted into said receiving channels of said top member, such that no additional mechanical fasteners or adhesives are required to construct said support stand.

2. The support stand of claim 1, where each of said receiving channels of said bottom member and of said top member define a segmented, generally C-shaped receiving channel.

3. The support stand of claim 1, where each of said slots of said side members extend only partially down each of said interior sides of said side members to provide an access opening in the rear of said support stand.

4. The support stand of claim 1, where said front member further comprises openings.

5. The support stand of claim 4, where said front member further comprises door members to cover said openings.

6. The support stand of claim 1, where said front edges of said side members extend even with said front side of said front member when said side members are perpendicular to said front member.

7. The support stand of claim 1, where said front edges of said side members extend beyond said front side of said front member when said side members are perpendicular to said front member.

8. The support stand of claim 1, where said front, side, top, bottom and back brace members are composed of wood.

\* \* \* \* \*